J. L. HEWITT.
MICROMETRIC PROTRACTOR.
APPLICATION FILED JUNE 22, 1914.

1,123,294.

Patented Jan. 5, 1915.
2 SHEETS—SHEET 1.

Witnesses.
Albert G. Siegenthowski
Fred L. Anderson

Inventor.
John L. Hewitt
By Horatio E. Bellows
Attorney.

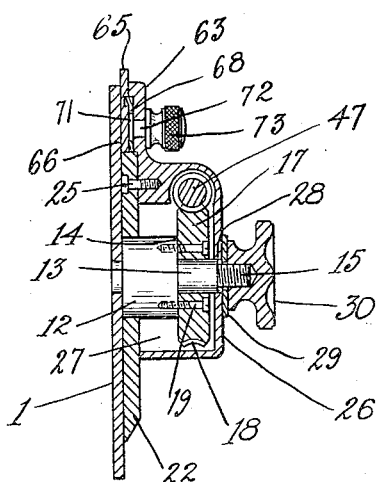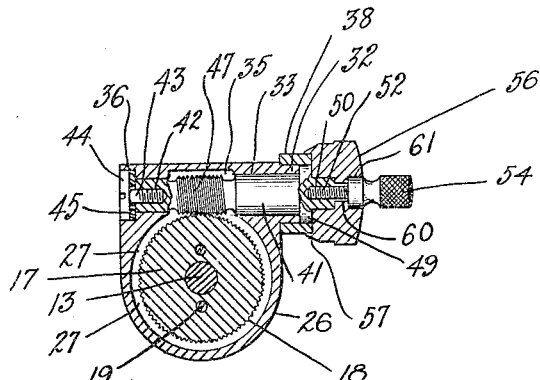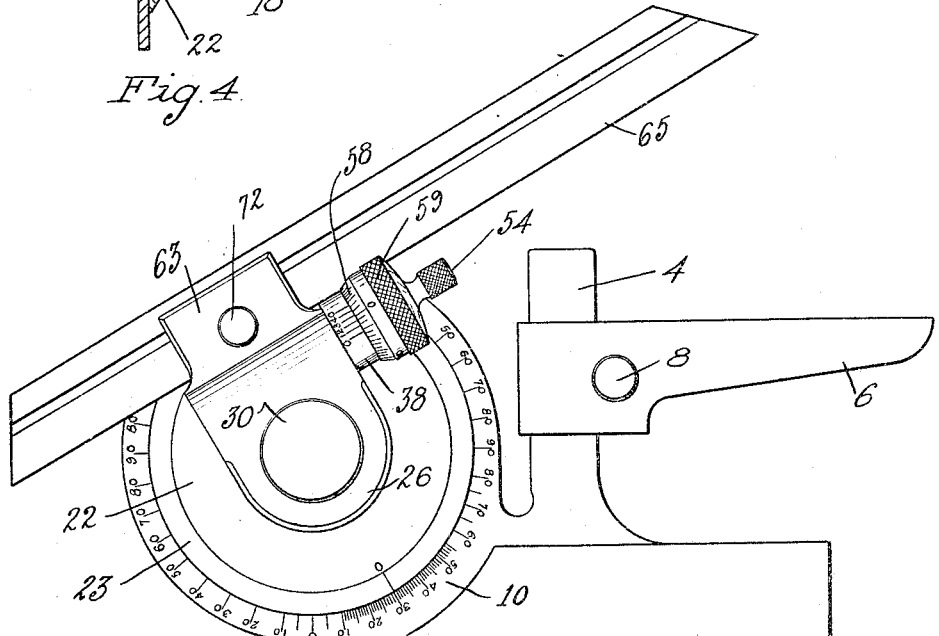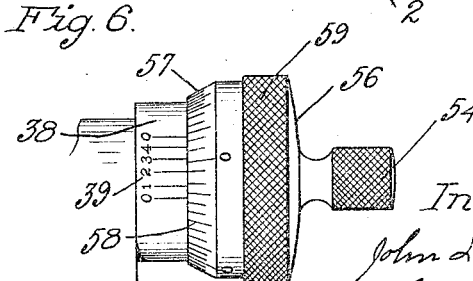

UNITED STATES PATENT OFFICE.

JOHN L. HEWITT, OF PROVIDENCE, RHODE ISLAND.

MICROMETRIC PROTRACTOR.

1,123,294.   Specification of Letters Patent.   Patented Jan. 5, 1915.

Application filed June 22, 1914.   Serial No. 846,467.

*To all whom it may concern:*

Be it known that I, JOHN L. HEWITT, a citizen of the United States, residing at Providence, in the county of Providence and State of Rhode Island, have invented certain new and useful Improvements in Micrometric Protractors, of which the following is a specification.

My invention relates to measuring instruments in the nature of bevel protractors, and has for its essential purposes the angular measurement of objects to a less degree than five minutes; to furnish a vernier reading in a rotary micrometric device for measuring angles; to afford means for verifying the accuracy of the readings; to render the operating parts dust proof, and to attain these ends in a structure which is strong, compact, facile and speedy to operate, not easily deranged, accurate, and readable directly.

To the above ends my invention consists in such parts and combinations of parts as fall within the scope of the appended claims.

Figure 1:
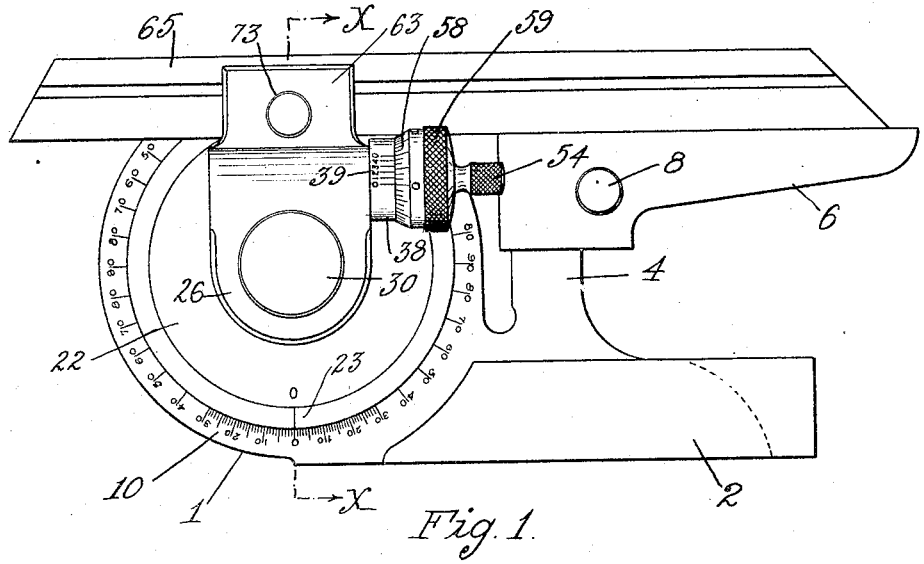
Figure 2:
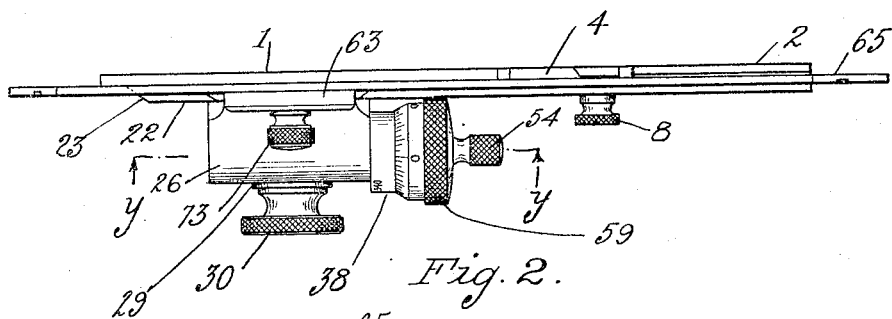
Figure 3:
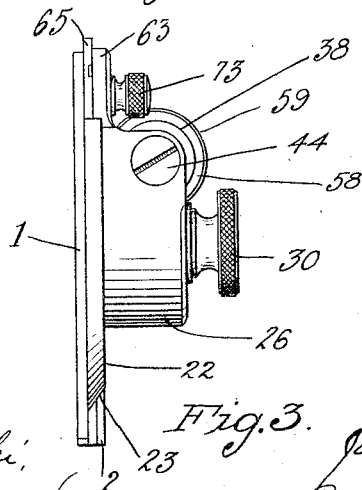

In the accompanying drawings which form a part of this specification, Figures 1, 2, and 3, are front, plan, and end elevations respectively of a measuring instrument embodying my invention, Figs. 4 and 5, sections on line $x$, $x$, of Fig. 1, and $y$, $y$, of Fig. 2 respectively, Fig. 6, a front elevation of the instrument in open position, and Fig. 7, an enlarged side elevation of the end of the barrel with the thimble mounted thereon.

Like reference characters indicate like parts throughout the views.

The frame of my instrument may be of the form best adapted for carrying the measuring mechanism, but in its present and preferred form of embodiment it comprises a circular head 1, a base 2, partially bifurcated and tangentially disposed with relation to the head, a vertical arm 4 integral with the base, and a straight edge 6 slidably mounted on the arm, parallel with the base, and vertically adjustable on the arm by a set screw 8.

The head is provided with a dial or circular scale of degree graduations 10, said graduations being divided into quadrants. Fixed in the head concentric with the scale is a post 12, having a reduced intermediate portion 13, forming a shoulder 14, and a reduced threaded end portion 15. Fixed to the portion 13 of the post is a worm wheel 17, provided with teeth 18, and which is attached to the shoulder 14 of the post by screws 19.

Revolubly mounted on the post 12 in contact with the head, is a dial or disk 22 having a beveled margin 23 provided with a zero mark adapted to coöperate with the degree scale. Fixed to the disk by screws 25 or otherwise is a casing 26 provided with a circular chamber 27 to receive the worm wheel, and having an opening 28 through its face to receive the end of the post portion 13, and through which projects the screw threaded end 15 of the post. Upon the last mentioned end is a washer 29 against which bears a milled nut 30 engaging the threaded end of the post. One end of the casing is extended as at 32, and has a cylindrical bore 33 tangentially disposed with relation to the worm wheel. The bore is enlarged intermediate its length, as at 35, and at one end, as at 36. Integral with or fixed to the extension 32 is a ring 38, the whole constituting a barrel. Upon the portion 38 is a graduated scale 39.

Rotatably mounted in the bore 33 is a shaft 41 having a threaded axial opening 42 in one end to receive a screw 43 whose head 44 is in the portion 36 of the bore and bears against a washer 45 also in the bore. Upon the shaft in the portion 35 of the bore is a worm 47 whose helical tooth engages the teeth 18 of the worm wheel. An annular shoulder 49 on the shaft abuts against the portion 32 of the barrel 38. The end of the shaft is provided with a threaded axial opening 50 adapted to receive the shank of a binding screw 52 provided with a milled head 54. Rotatably mounted on the end of the shaft 41 is a thimble 56 having a beveled margin 57 overlapping the barrel or ring 38, upon which margin is a graduated scale 58 coöperating with the scale 39. The exterior of the thimble is knurled as at 59, and it is provided with a central threaded opening 60 to loosely receive the screw 52, and has an enlarged opening 61 to receive a portion of the head 54 of the screw. By this screw the thimble may be clamped to the shaft at any desired point in the rotation of the thimble.

The casing 26 has a lug or projection 63 intermediate which and the head 1 is slidably mounted the blade 65 with its groove 66. The inner edge of the blade rests against the plane edge 66 of the disk 22, see Fig. 4, the disk having a portion of its margin cut away for this purpose. The blade may be clamped in any convenient manner. In the present instance the means is a clamping plate 68 slidable in the face of the lug, having a flange 69 registering in the groove 66, and provided with a central opening to receive a cam 71 upon the end of a pin 72 rotatably mounted in the lug and provided with a milled head 73.

The degree scale 10 measures a circumference and is divided into quadrants graduated to degrees.

The thimble scale 58, which reduces the degree scale 10, comprises forty-eight graduations divided into four divisions or degrees of twelve graduations each, so that a single graduation measures one twelfth of a degree, or an angle of five minutes.

The vernier or barrel scale 39 which reduces the minute or thimble scale 58 and cooperates with the latter, comprises six graduation lines marked 0, 1, 2, 3, 4, and 0 respectively, constituting five spaces or graduations. These graduations if extended around the barrel would number forty, so that the five graduations on the barrel constitute an eighth of the circumference of the barrel and equal the space of six graduations on the thimble, which six thimble graduations represent one-eighth of the circumference of the thimble. In other words one graduation on the barrel equals one and one-fifth of a graduation on the thimble.

The methods of applying my instrument to articles to be measured are numerous and need not be enumerated.

The angular surfaces may be placed intermediate the members 6 and 65, after the members have been sufficiently distended as shown in Fig. 6. This distension is effected by manually rotating the thimble 56 and the shaft 41 to which it is fixed. The worm 47 operating on the worm wheel 17 moves the casing 26 and its attached disk 22 relatively to the member 6 and to the head 1, thus moving the blade 65 and registering the number of whole degrees of the angle on the scale 10. In Fig. 6 the measurement is shown as 30 degrees and a fraction. In measuring the remaining fraction the thimble is turned to the right as shown in Figs. 6 and 7 the number of graduations on the scale 57 between its 0 and the lower 0 on the scale 39 are counted, making in this instance three and a fraction or fifteen minutes and a fraction. This fraction is ascertained by using the scale 39 as a vernier whereby it is noted that graduation 2 thereof is the one which coincides with the thimble graduations, showing that the fraction to be added is 2 minutes. The total reading, therefore, is thirty degrees and seventeen minutes, the measurement of the complete angle. This instrument is thus capable of direct readings to a minute.

If it is desired to temporarily maintain the blade 65 and member 6 in any relative position this end may be effected by turning the clamping nut 30 which binds the disk 22 tightly against the head 1 of the frame.

The screw 54 is employed to set the blade relatively to the base when a try square is used. In this test the screw 54 is loosened and by a right hand turn the 0 graduation of the thimble is brought into line with the 0 graduation of the barrel, whereupon the screw is tightened making the thimble and worm shaft practically one.

By reason of the use of the vernier principle this device is operable by a small number of thimble or screw rotations. Otherwise the diameter of the thimble would be excessive, or the worm would be so fine as to render operation excessively slow, and the graduations on the thimble would be extremely fine.

What I claim is,—

1. In a protractor, the combination of a frame, a post on the frame, a disk rotatably mounted on the post, a worm wheel fixed to the post, a casing on the disk, a blade upon the casing, a barrel in the casing, a shaft in the barrel, a worm on the shaft engaging the wheel, and a thimble on the shaft.

2. In a protractor, the combination of a frame, a post upon the frame, a disk rotatably mounted on the post, a worm wheel fixed to the post, a casing on the disk, a blade upon the casing, a barrel in the casing, a vernier scale upon the barrel, a shaft in the barrel, a worm on the shaft engaging the wheel, and a thimble on the shaft overlapping the barrel, and graduations on the thimble.

3. In a protractor, the combination of a frame, a scale on the frame, a post on the frame concentric with the scale, a disk rotatably mounted on the post in contact with the frame, a worm wheel fixed to the post, a casing on the disk, a blade upon the casing, a barrel in the casing, a vernier scale upon the barrel, a shaft in the barrel, a worm on the shaft engaging the wheel, a thimble on the shaft overlapping the barrel, and a scale upon the thimble coöperating with the vernier scale.

4. In a protractor, the combination of a frame, a scale upon the frame, a post on the frame concentric with the scale, a disk rotatably mounted on the post in contact with the frame, a worm wheel fixed to the post, a casing on the disk, a blade upon the casing, a barrel in the casing, a vernier scale upon the barrel, a shaft in the barrel, a worm on the shaft engaging the wheel, a thimble upon the barrel provided with a threaded axial opening, a scale upon the thimble coöperating with the vernier scale, and a binding screw in the axial opening engaging the end of the shaft.

5. In a protractor, the combination of a frame, a post upon the frame, a disk rotatably mounted on the post, a worm wheel fixed to the post, a casing fixed to the disk and provided with an opening to receive the end of the post, a nut upon the end of the post exterior of the casing, a blade upon the casing, a barrel in the casing, a shaft in the barrel, a worm on the shaft engaging the wheel, and a thimble on the shaft overlapping the barrel.

6. In a protractor, the combination of a frame, a scale upon the frame graduated to degrees, a post upon the frame concentric with the scale, a disk rotatably mounted on the post, a worm wheel fixed to the post, a casing on the disk, a blade upon the casing, a barrel on the casing, a shaft in the barrel, a worm on the shaft engaging the wheel, a thimble on the shaft overlapping the barrel, a scale upon the thimble graduated to five minutes, and a scale upon the barrel graduated to one minute.

7. In a protractor, the combination of a frame, a graduated scale upon the frame, a measuring disk rotatably mounted upon the frame, a blade carried by the disk, a barrel upon the disk, a worm in the barrel, a worm wheel on the frame engaging the worm, a vernier scale upon the barrel, a thimble upon the barrel engaging the worm, and a graduated scale upon the thimble coöperating with the vernier scale.

In testimony whereof I have affixed my signature in presence of two witnesses.

JOHN L. HEWITT.

Witnesses:
 HORATIO E. BELLOWS,
 WASHINGTON R. PRESCOTT.

Copies of this patent may be obtained for five cents each, by addressing the "Commissioner of Patents, Washington, D. C."